United States Patent [19]

Katz

[11] Patent Number: 4,535,998

[45] Date of Patent: Aug. 20, 1985

[54] SEALING DEVICE FOR HYDRAULIC ENERGY DISSIPATOR OF THE TELESCOPIC TYPE

[75] Inventor: Maurice Katz, Paris, France

[73] Assignee: Creusot-Loire, Paris, France

[21] Appl. No.: 579,938

[22] Filed: Feb. 14, 1984

[30] Foreign Application Priority Data

Feb. 18, 1983 [FR] France ................................ 83 02645

[51] Int. Cl.³ .............................................. F16J 15/18
[52] U.S. Cl. ............................................. 277/212 FB
[58] Field of Search ....................... 277/212 R, 212 FB

[56] References Cited

U.S. PATENT DOCUMENTS

| 3,688,523 | 9/1972 | Schafer | 277/212 FB |
| 4,116,115 | 9/1978 | Gross et al. | 277/212 FB |
| 4,211,423 | 7/1980 | Resech | 277/212 FB |

Primary Examiner—Robert I. Smith
Attorney, Agent, or Firm—Pollock, Vande Sande & Priddy

[57] ABSTRACT

Sealing device for an hydraulic energy dissipator of the telescopic type, formed by a seal comprising a cylindrical ring which grips the rod of the piston and which is extended by a fluid-tight bellows so as to permit axial movement of the seal in its housing following small amplitude movements of the rod. The device is useful for railway suspension shock absorbers.

8 Claims, 3 Drawing Figures

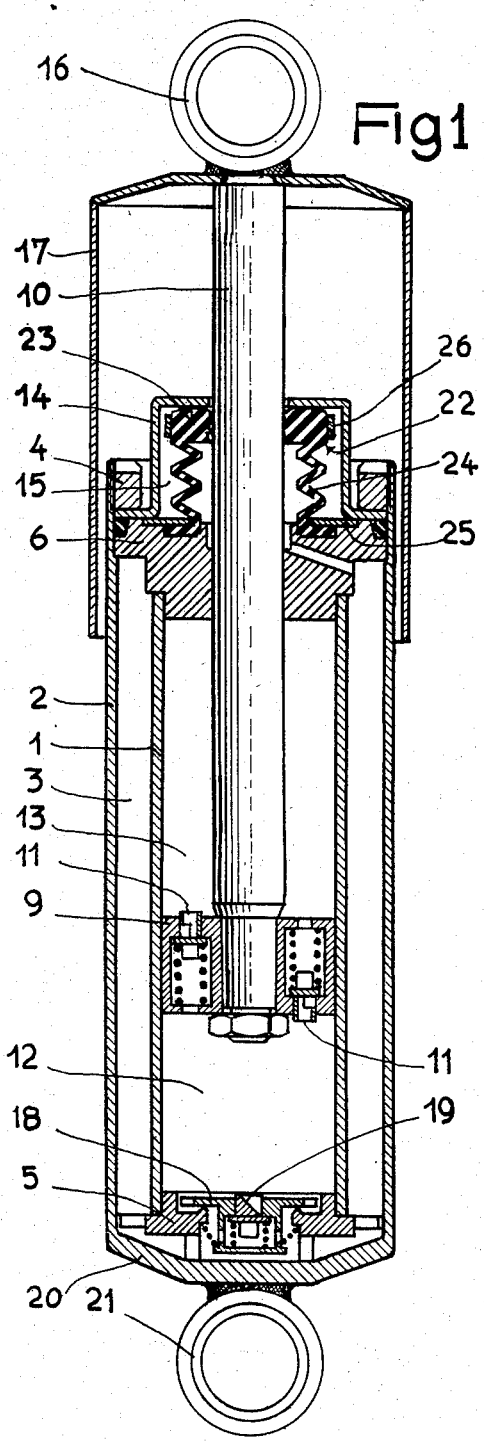
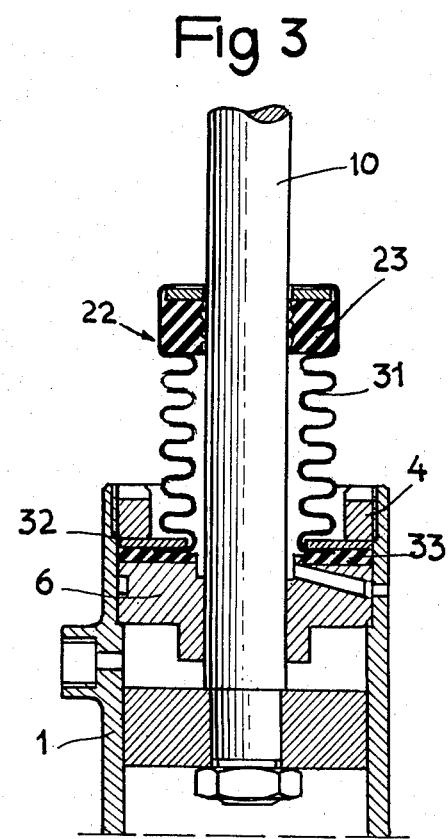
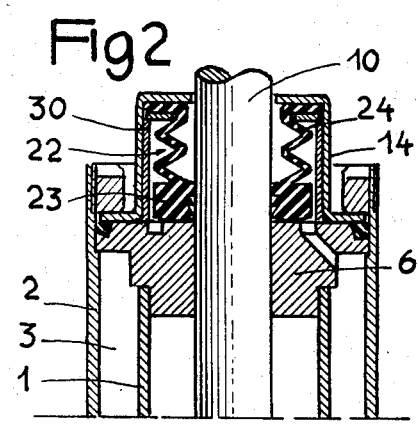

SEALING DEVICE FOR HYDRAULIC ENERGY DISSIPATOR OF THE TELESCOPIC TYPE

FIELD OF THE INVENTION

The present invention relates to a sealing device for an hydraulic energy dissipator of the telescopic type, particularly for railway rolling stock suspensions.

BACKGROUND OF THE INVENTION

For such suspensions, it is known that damping devices which dissipate the mechanical energy as heat by shearing of oil driven by a piston through throttled passages, does not incorporate all the characteristics desired, and in particular lacks insufficient reliability.

In fact, the most common damping devices, of the telescopic piston type actuated by a rod in a cylinder filled with oil, do not generally permit suitable damping of oscillating movements of small amplitude or vibrations generated by the wheels, since they are easily initiated at rest and then necessitate long paths with oscillations of large amplitude to return to the normal operating stage. However the piston sucks in first, in each direction of movement, the air dissolved in the oil; on its return, this creates a vacuum causing the cavitation phenomenon manifested by particularly unpleasant hard and violent jerks.

To overcome these drawbacks, shock-absorbers are known in which a slight permanent overpressure of the liquid completely filling the working chambers is maintained, by means of a compensating chamber where the reserve liquid is itself kept under pressure by spring or pneumatic devices.

However, in the field of railway suspensions, it is known that the oscillations to be damped are in the majority of cases vibrations of small amplitude with, from time to time, one or several distinctly bigger oscillations.

This causes a sealing problem around the rod of the piston in its passage through the jacket of the apparatus. In fact, if seals are used with considerable friction on the rod, the small oscillating movements are transmitted through the seals to the whole of the body. It is possible to reduce the friction a little so as to permit between the rod and the seal small amplitude movements which are then damped by the working of the fluid in the chambers; however in this case the very numerous oscillating movements result in rapid wear of the seals, and consequently leakages of oil which, in their turn, will result in a reduction in the permanent pressure in the apparatus and the appearance of cavitation phenomena.

This drawback is particularly troublesome in the railway field, since the mileage travelled by a vehicle between two major maintenance operations is generally considerable, so that effective active life of the shock absorbers is often well below the time between two successive adjustments.

Sealing devices formed by a diaphragm seal which grips the piston rod are also known, but the elasticity and the motion of this type of seal are distinctly insufficient to avoid its slippage with respect to the piston rod, as well as premature wear.

SUMMARY OF THE INVENTION

The present invention is intended to overcome such drawbacks, and it applies therefore to an hydraulic dissipator of energy of a moving mass, of the telescopic type, comprising:

(1) a working cylinder filled with liquid and divided into two chambers by a piston provided with calibrated valves determining the hydraulic resistance, and of which the rod connected to the moving mass is guided through one of the ends of the cylinder, (2) an auxiliary annular compensating chamber surrounding the working cylinder, communicating through a valve and a calibrated valve with the working chamber opposite the rod of the piston, and (3) a sealing device for the exit of the piston rod, arranged in a housing extending the working cylinder on the rod side.

According to the invention, the sealing device is formed by a seal comprising a cylindrical ring which grips the rod of the piston and which is extended by a fluid-tight bellows, coaxial with said rod, permitting axial movement of the seal in its housing, following the low amplitude movements of said rod.

BRIEF DESCRIPTION OF THE DRAWINGS

The invention will be better understood by means of the following description referring to particular embodiments given by way of example and referring to the accompanying drawings in which FIG. 1 is an axial section view of an hydraulic dissipator of energy provided with the sealing device according to the invention.

FIG. 2 is a partial axial section view of a second embodiment of the invention.

FIG. 3 is a partial axial view of a third embodiment of the invention.

DETAILED DESCRIPTION OF PREFERRED EMBODIMENTS

Referring first to FIG. 1, the energy dissipator comprises a working cylinder 1, surrounded by coaxial tube 2, forming with it an annular chamber 3. The working cylinder 1 is closed by a lower end 5 and by an upper 6 end constituting the counter-piston. A piston 9, sliding inside the working cylinder 1 and fixed to a rod 10, comprises two inverted and calibrated valves 11. This piston 9 divides the working cylinder 1 into two chambers 12 and 13.

The rod 10 passes through the counter-piston 6 through an orifice which constitutes a simple guide, with very limited play, but without being fluid-tight. A plug 14, held on the counter-piston 6 by a nut 4 screwed into the upper part of the tube 2, forms with said counter-piston a housing 15 for the mounting of a sealing device applied to the piston rod. This rod 10 is provided, at its outer end, with a coupling 16 and a protecting box 17. The lower end of the working cylinder 1 comprises a valve 18 opening wide passages to the liquid from the annular chamber 3 through the working chamber 12 on the aspiration of piston 9 and through a valve 19 which inversely opens a restricted passage to the annular chamber 3.

Tube 2 is hermetically closed by cup 20 bearing the lower coupling 21.

In the housing 15 is mounted a fluid-tight seal formed by a cylindrical ring 23 which by friction adheres fairly firmly to the rod 10 and which is extended by a fluid-tight bellows 24, of the which last fold is fixed by a washer 25 on its seat provided in the counter-piston 6. The inside of the bellows 24 communicates freely through wide apertures with the annular chamber 3.

The upper surface of the cylindrical ring 23 is slightly bulged to avoid a suction effect between this ring and the plug 14. It is also possible to roughen this upper surface, again to avoid the suction effect.

On the other hand, on the side face of the cylindrical ring 23 is mounted a gripping ring 26 in order to prevent the swelling of the seal under the effect of temperature. This gripping ring can optionally be molded directly in the ring of the seal.

During the movements of the rod 10, the cylindrical ring 23 of the seal 22, which by friction adheres fairly firmly to the rod 10, first follows the latter without slippage by drawing the bellows 24 until it comes possibly to abut the bottom of the plug 14 in the case of an extension movement exceeding a certain amplitude. Only then, if the movement continues further, the ring 23 starts to slide on the rod 10. In the opposite direction, in the case of a compressive movement, the ring 23 of the seal is driven downwards by friction. The fluid-tight bellows 24 hence permits greater movement than with customary seals of the diaphragm type.

In the case of oscillations of small amplitudes, which represent by far the large majority of movements, the ring 23 of the seal 22 remains stuck to the rod 10, following its motion without sliding. Since the wear of the seal is caused solely by sliding, there will hence be no wear in this case. Thus, the seal will wear only upon movements of the greatest amplitudes, which are very infrequent, and there will therefore have an exceptionally long life. Another advantage of the dissipator according to the invention is the elimination of vibrations and tremors customarily transmitted to the suspended portion because of the friction of the seal during small oscillations. On oscillations of greater amplitude, the relative value of the frictional forces with respect to the hydraulic reaction, which moreover is gradually initiated, becomes negligible, whence great gentleness of operation in all cases.

In the embodiment of the dissipator according to FIG. 2, the ring 23 of the seal 22 is oriented downwards and the last fold of the bellows 24 is fixed in fluid-tight manner to the upper portion of the housing 15 on the plug 14 by a support washer 30. The active surface of the seal is hence oriented towards the inside and communicates through very wide passages with the annular chamber 3, of which the low pressure, whether of air or of liquid, is exerted outside the seal 22, and tends, consequently, to grip it against the rod 10, which can sometimes offer an advantage of still longer service, particularly in the case of relatively greater oscillations.

In FIG. 3, the fluid-tight seal 22 is composed also of a cylindrical ring 23 crimped at the upper portion of a metal bellows 31 of which the last fold is fixed to the counter-piston 6 by the nut 4 by means of a fluid-tight seal 32 and a washer 33.

To ensure in all cases the possibility of axial movement of the seal without sliding on the piston rod, it would be possible also to provide helicoidal-shaped bellows, reinforced or not with spring-forming metal wires, or again provided with end pieces of elastic tubing enabling the axial deformations.

I claim:
1. Sealing device for an hydraulic energy dissipator of the telescopic type, comprising
 (a) a working cylinder filled with liquid and divided into two chambers by an axially moving piston provided with calibrated valves determining the hydraulic resistance, a piston rod of said piston being guided through a first end of said cylinder;
 (b) an annular compensating chamber surrounding said working cylinder and communicating through a valve and a calibrated valve with said working chamber adjacent the end of said cylinder remote from said piston rod;
 (c) a fluid-tight seal for the exit of said piston arranged in a housing extending said working cylinder on the rod side, said fluid-tight seal being formed from a cylindrical ring which grips said piston rod and which is extended by a fluid-tight bellows, coaxial with said rod, enabling axial movement of said seal in said housing.

2. Sealing device according to claim 1, wherein said cylindrical ring has a slightly convex upper surface.

3. Sealing device according to claim 1, wherein said cylindrical ring has an upper surface which comprises roughnesses in relief.

4. Sealing device according to claim 1, comprising a gripping ring mounted on a lateral surface of said cylindrical ring.

5. Sealing device according to claim 4, wherein said gripping ring is directly molded in said cylindrical ring.

6. Sealing device according to claim 1, wherein the last fold of the bellows is fixed in sealed manner to one or other of the end surfaces of the housing.

7. Sealing device according to claim 1, wherein the fluid-tight bellows is a metal bellows at the upper portion of which is crimped the cylindrical ring of the fluid-tight seal.

8. Sealing device according to claim 1, wherein the fluid-tight bellows is a bellows of helicoidal shape.

* * * * *